United States Patent
Jakob et al.

(10) Patent No.: US 11,606,283 B1
(45) Date of Patent: Mar. 14, 2023

(54) OVERCOMING MULTI-FACTOR AUTHENTICATION IN USER INTERFACE BASED AUTOMATION SCRIPT

(71) Applicant: MICRO FOCUS LLC, Santa Clara, CA (US)

(72) Inventors: Eyal Jakob, Cumming, GA (US); Vladyslav Voloshyn, Cumming, GA (US); Constantine Adarchenko, Alpharetta, GA (US)

(73) Assignee: Micro Focus LLC, Santa Clara, CA (US)

(*) Notice: Subject to any disclaimer, the term of this patent is extended or adjusted under 35 U.S.C. 154(b) by 0 days.

(21) Appl. No.: 17/669,095

(22) Filed: Feb. 10, 2022

Related U.S. Application Data

(60) Provisional application No. 63/280,025, filed on Nov. 16, 2021.

(51) Int. Cl.
  *H04L 43/50* (2022.01)
  *H04L 67/02* (2022.01)
  *H04L 9/40* (2022.01)

(52) U.S. Cl.
  CPC ............ *H04L 43/50* (2013.01); *H04L 63/083* (2013.01); *H04L 67/02* (2013.01); *H04L 2463/082* (2013.01)

(58) Field of Classification Search
  None
  See application file for complete search history.

(56) References Cited

U.S. PATENT DOCUMENTS

| | | | |
|---|---|---|---|
| 11,102,081 B1* | 8/2021 | Tiwari | G06F 11/3688 |
| 11,196,728 B1* | 12/2021 | Fu | G06F 11/3664 |
| 2012/0204032 A1* | 8/2012 | Wilkins | H04L 63/0428 713/170 |
| 2013/0103544 A1* | 4/2013 | Nandakumar | G06Q 30/0609 705/26.41 |
| 2013/0104212 A1* | 4/2013 | Nandakumar | H04L 9/3271 726/7 |
| 2014/0237562 A1* | 8/2014 | Nandakumar | G06Q 20/4014 726/5 |
| 2021/0182272 A1* | 6/2021 | Shpurov | G06F 16/2365 |

\* cited by examiner

*Primary Examiner* — Quang N Nguyen
(74) *Attorney, Agent, or Firm* — Sheridan Ross P.C.

(57) ABSTRACT

A request is received from a browser (e.g., a tool that runs on top of or in a browser). The request is to authenticate via an authentication credential provided from a communication device that is external to a test communication device running the browser. The request is queued in a request queue. The authentication credential is received from an interceptor that intercepts the authentication credential in the external communication device. The authentication credential is sent to the browser, which in turn sends the authentication credential to the application under test. This completes the authentication process in the application under test. The request is then removed from the request queue. This allows for an automated multi-factor authentication process that can be used for testing the application under test.

14 Claims, 8 Drawing Sheets

OVERCOMING MULTI-FACTOR AUTHENTICATION IN USER INTERFACE BASED AUTOMATION SCRIPT

CROSS REFERENCE TO RELATED APPLICATION

The present application claims the benefits of U.S. Provisional Application Ser. No. 63/280,025, filed Nov. 16, 2021, entitled "OVERCOMING 2 FACTOR AUTHENTICATION IN UI BASED AUTOMATION SCRIPT", which is incorporated herein by reference in its entirety.

FIELD

The disclosure relates generally to automated user interface testing and particularly to automating multi factor authentication in a testing environment.

BACKGROUND

In dynamic application security testing, automating an application login process plays a critical role; without it, dynamic application testing would be incomplete, and the test results discovered by the automated testing process are limited. While in some cases a username/password is sufficient, in many modern web applications multi-factor authentication mechanisms are starting to be more commonplace. Multi-factor authentication augments the standard password, which is defined as the "something you know" with another authentication credentials, such as, a One-Time Passcode (OTP) sent by Short Message Service (SMS) or Simple Mail Transfer Protocol (SMTP), Post Office Protocol 3 (Pop3), Internet Message Access Protocol (IMAP), a fingerprint scan, a faceprint scan, a retinal scan, and/or the like. While this second factor of authentication improves security, in many cases, it requires an external entity to approve or initiate the login process. This dramatically complicates the automation testing process.

SUMMARY

These and other needs are addressed by the various embodiments and configurations of the present disclosure. The present disclosure can provide a number of advantages depending on the particular configuration. These and other advantages will be apparent from the disclosure contained herein.

A request is received from a browser (e.g., a tool that runs on top of or in a browser). The request is to authenticate via an authentication credential provided from a communication device that is external to a test communication device running the browser. The request is queued in a request queue. The authentication credential is received from an interceptor that intercepts the authentication credential in the external communication device. The authentication credential is sent to the browser, which in turn sends the authentication credential to the application under test. This completes the authentication process in the application under test. The request is then removed from the request queue. This allows for an automated multi-factor authentication process that can be used for testing the application under test.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, the term "browser" may include a plugin to the browser, user interface automation tool that resides within the browser, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 7 is a flow diagram of a process for determining which request queue to remove an authentication request from.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
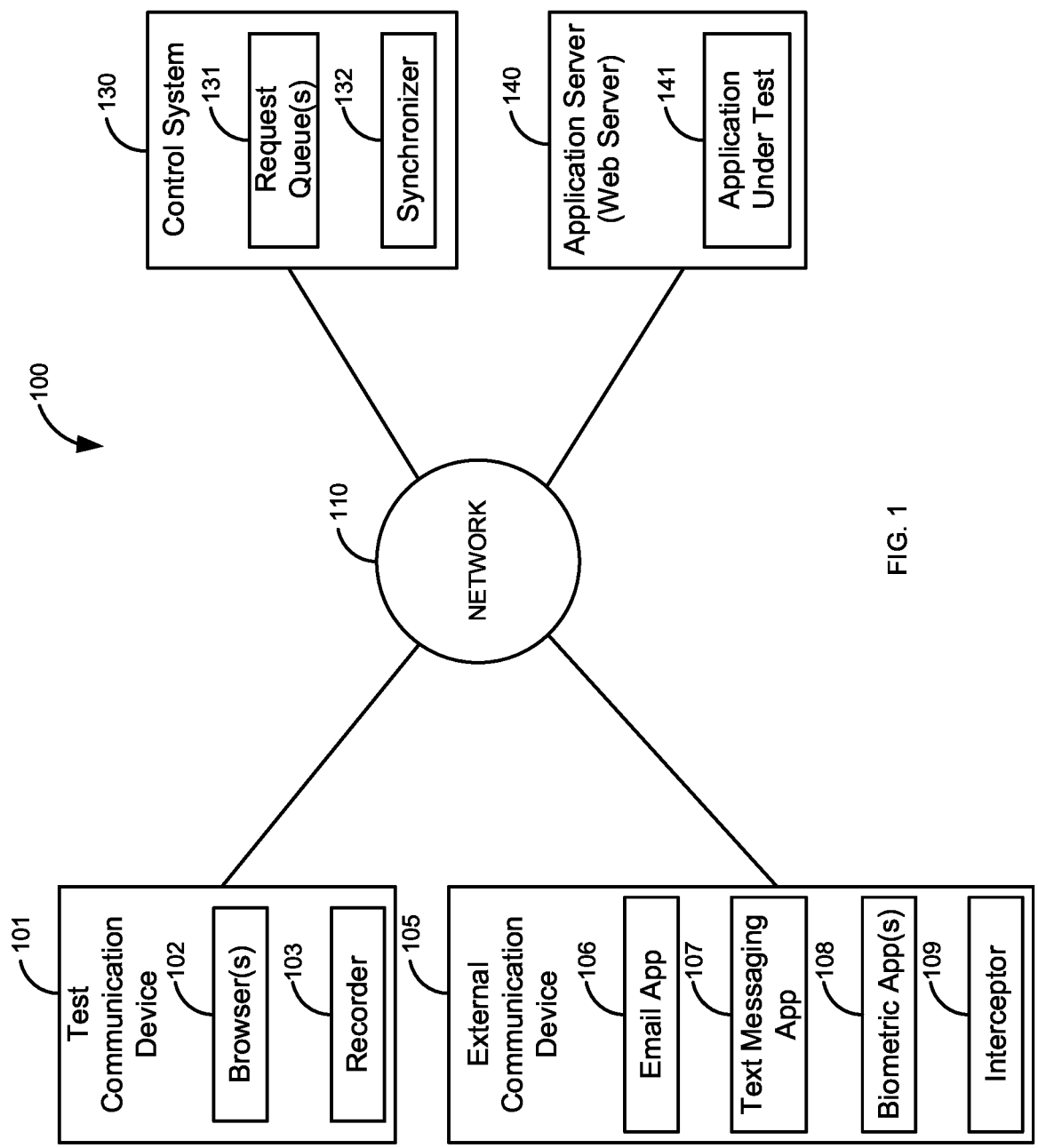
FIG. 1 is a block diagram of a first illustrative system for automatically providing multi-factor authentication in a test environment.

FIG. 1 is a block diagram of a first illustrative system 100 for automatically providing multi-factor authentication in a test environment. The first illustrative system 100 comprises a test communication device 101, an external communication device 105, a control system 130, and an application server 140.

The test communication device 101 can be or may include any device that can be used to test the application under test 141, such as a Personal Computer (PC), a telephone, a video system, a cellular telephone, a Personal Digital Assistant (PDA), a tablet device, a notebook device, a smartphone, and/or the like. FIG. 1 is an exemplary embodiment where only a single test communication device 101 is used to test the application under test 141.

The test communication device 101 further comprises one or more browsers 102 and a recorder 103. The browser(s) 102 may be any known browsers 102, such as, Internet Explorer®, Microsoft Edge®, Google Chrome®, Mozilla Firefox®, Safari®, Opera®, and/or the like. The browser(s) 102 are used to test the application under test 141.

The recorder 103 is used to record tests/authentication processes for testing the application under test 141. The recorder 103 may be a plugin to the browser(s) 102, may be a standalone application, and/or the like. The recorder 103 may also help manage the multi-factor authentication processes described herein.

The external communication device 105 may be similar to the test communication device 101. For example, the external communication device 105 may be a smartphone or personal computer. The external communication device 105 is a device that is used to provide an additional authentication factor(s) in the authentication process, such as, a SMS authentication process, an email authentication process, a chat authentication process, a question authentication process, a biometric authentication process, and/or the like. The external communication device 105 further comprises an email application 106, a text messaging application 107 (e.g., a SMS application), one or more biometric applications 108, and an interceptor 109. Although not shown the external communication device 105 may comprise other authentication applications, such as, a chat application, a question answer application, and/or the like.

The email application 106 can be or may include any email application 106, such as, Google Mail®, Microsoft Outlook®, Zoho Mail, Protonmail, and/or the like. The email application 106 is used to capture authentication codes that are sent from the application under test 141. The authentication codes for the various types of email applications 106 may be intercepted in various ways, such as, using hooks, network middleware, and/or the like.

The text messaging application 107 can be or may include any test message text messaging application 107, such as, a SMS application, Google Messages®, and/or the like. The text messaging application 107 is used to receive authentication codes that are sent from the application under test 141.

The biometric application(s) 108 can be or may include any type of biometric application 108, such as, a fingerprint scanner, a palm scanner, a retinal scanner, a facial scanner, a voiceprint application, and/or the like. The biometric application(s) 108 are used to capture biometric information for authenticating a user.

The interceptor 109 is an application that is used to intercept authentication codes, biometric information, and other authentication information sent to and/or from the external communication device 105.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The control system 130 can be or may include any hardware coupled with software that can be used to automate a multi-factor authentication process for testing the application under test 141. The control system 130 may be a separate communication device, a separate application (e.g., a separate process on a different thread/core), and/or the like. The control system 130 further comprises request queue(s) 131 and a synchronizer 132.

The request queue(s) 131 are used for queuing requests to authenticate a user. The test communication device 101 may have one or more outstanding authentication requests. For example, an authentication request may be stored in the request queue 131 until an authentication code has been provided to the application under test 141.

The synchronizer 132 can be or may include any hardware coupled with software that can manage and synchronize the authentication process. In one embodiment, the synchronizer 132 manages and synchronizes the authentication process via the request queue(s) 131.

The application server 140 can be or may include any hardware coupled with software that can host the application under test 141. For example, the application server 140 may be a web server, a network device, a security device, a personal computer, a user device, and/or the like. The application server 140 further comprises the application under test 141.

The application under test 141 can be or may include any application, such as, a web application, a social media application, a financial application, a security application, a database, an email application, a human resources application, an online store application, and/or the like. The application under test 141 may include multiple applications under test 141.

Figure 2:
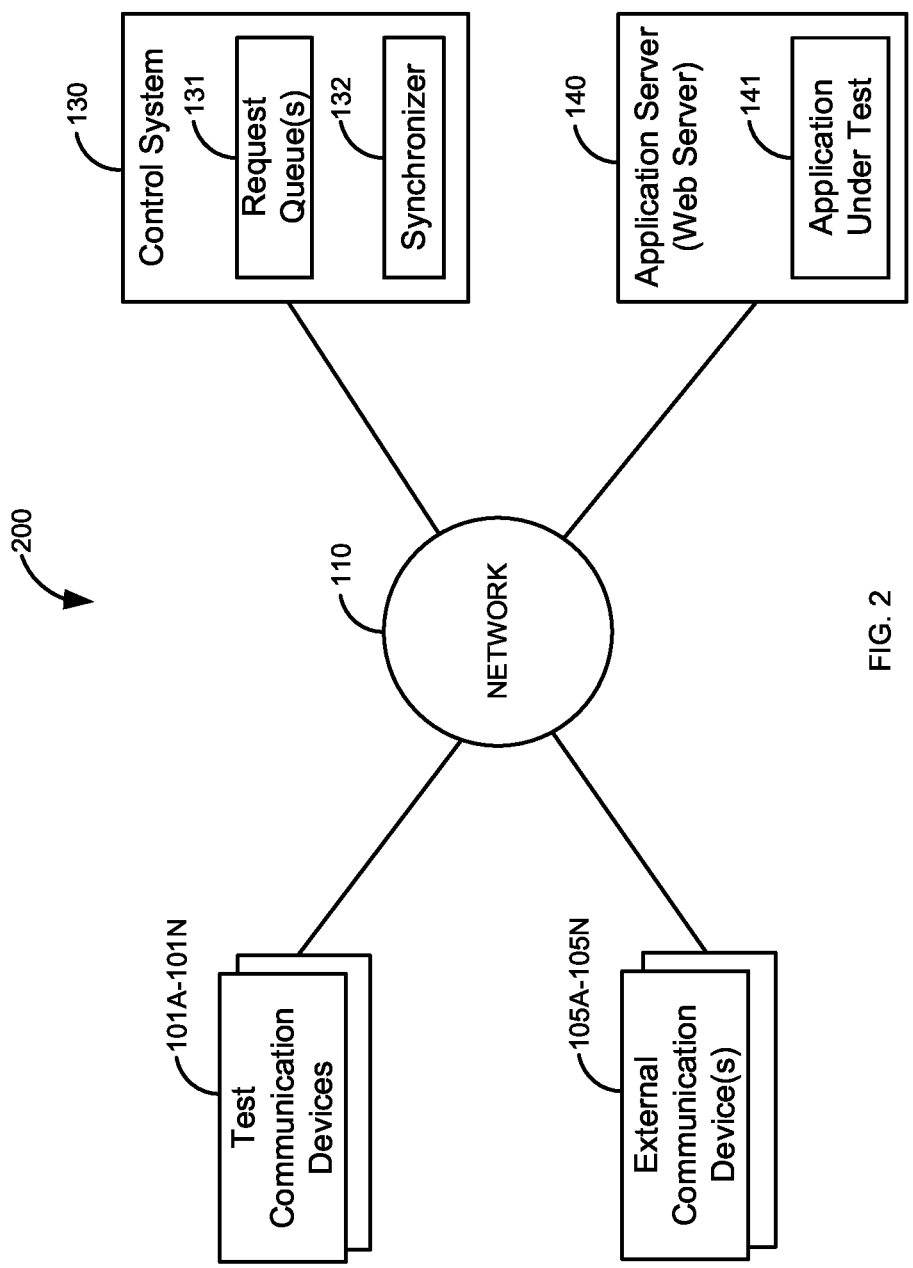
FIG. 2 is a block diagram of a second illustrative system for automatically providing multi-factor authentication in a test environment for multiple devices.

FIG. 2 is a block diagram of a second illustrative system 200 for automatically providing multi-factor authentication in a test environment for multiple devices. The second illustrative system 200 comprises test communication devices 101A-101N, external communication devices 105A-105N, the network 110, the control system 130, and the application server 140. In FIG. 2, the test communication devices 101A-101N and the external communication devices 105A-105N may also comprise the respective elements 102-103/106-109.

FIG. 2 comprises multiple test communication devices 101A-101N and multiple external communication devices 105A-105N. The multiple test communication devices 101A-101N and the multiple external communication devices 105A-105N are used to simulate multiple users authenticating to the application under test 141 at the same time with the control system 130/application server 140 described in FIG. 1. By having the multiple test communication devices 101A-101N and multiple external communication devices 105A-105N, a more realistic simulation of the real-world environment can be achieved in the test environment.

Figure 3:
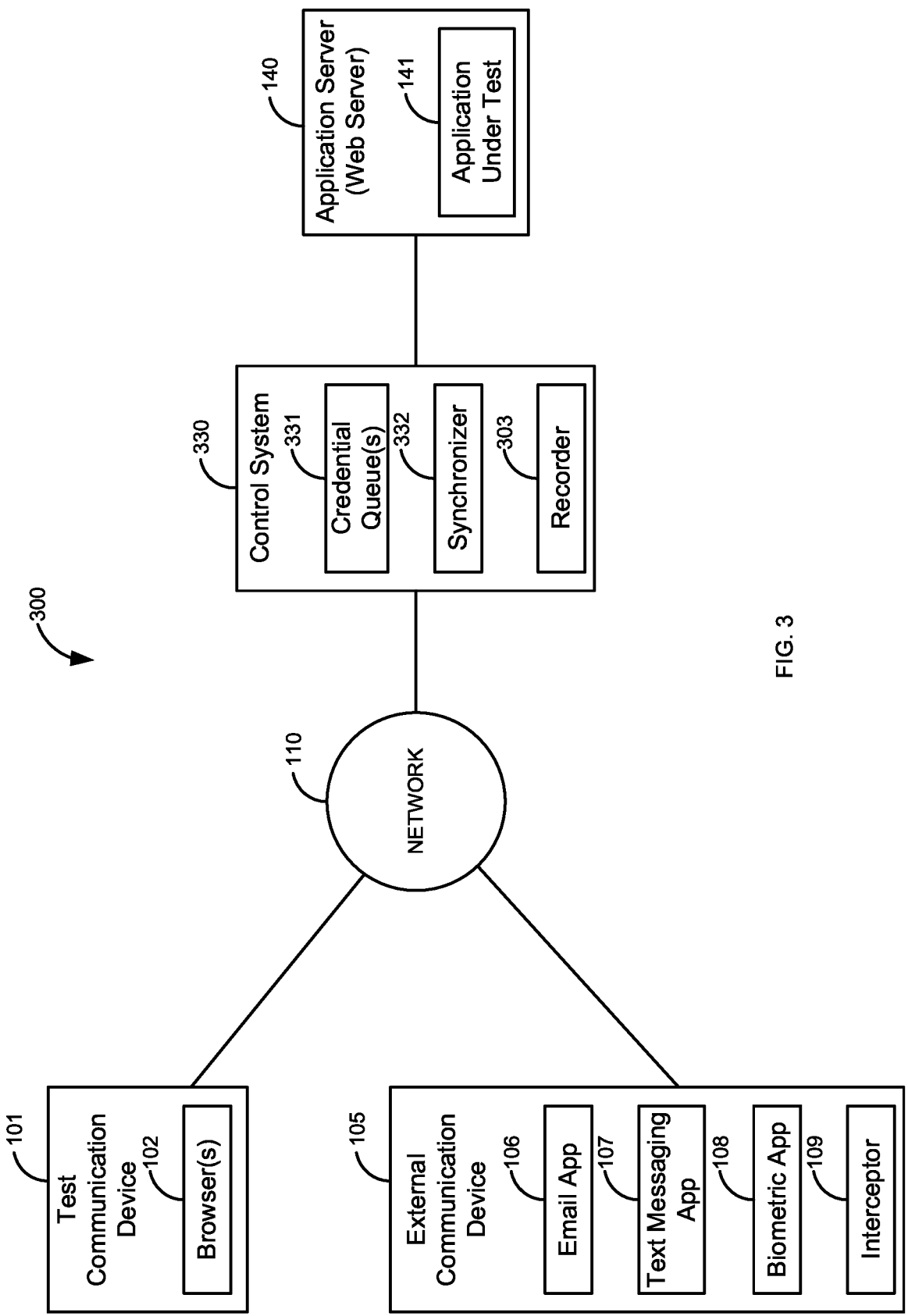
FIG. 3 is a block diagram of a third illustrative system for automatically providing multi-factor authentication in a test environment.

FIG. 3 is a block diagram of a third illustrative system 300 for automatically providing multi-factor authentication in a test environment. The third illustrative system comprises the test communication device 101, the external communication device 105, the network 110, a control system 330, and the application server 140.

The test communication device 101 comprises the browser(s) 102. In this embodiment, test communication device 101 does not have the recorder 103.

The external communication device 105 comprises the email application 106, the text messaging application 107, the biometric application 108, and the interceptor 109 like described in FIG. 1. Likewise, the network 110 may be similar to the network 110 described in FIG. 1.

The control system 330 works differently than the control system 130. The control system 330 comprises credential queue(s) 331, synchronizer 332, and recorder 303. The credential queue(s) 331 are used to store authentication codes/biometric data for authenticating a user using multi-factor authentication.

The synchronizer 332 can be or may include any hardware coupled with software that is used to synchronize requests/authentication codes/biometric data received from the interceptor 109 via the credential queue(s) 331. The synchronizer 332 may synchronize multiple authentication credentials required for the same user and/or for multiple users.

The recorder 303 may work similar to the recorder 103. However, the recorder 303 intercepts/records messages sent between the browser 102 and the application under test 141 in the application server 140.

Figure 4:
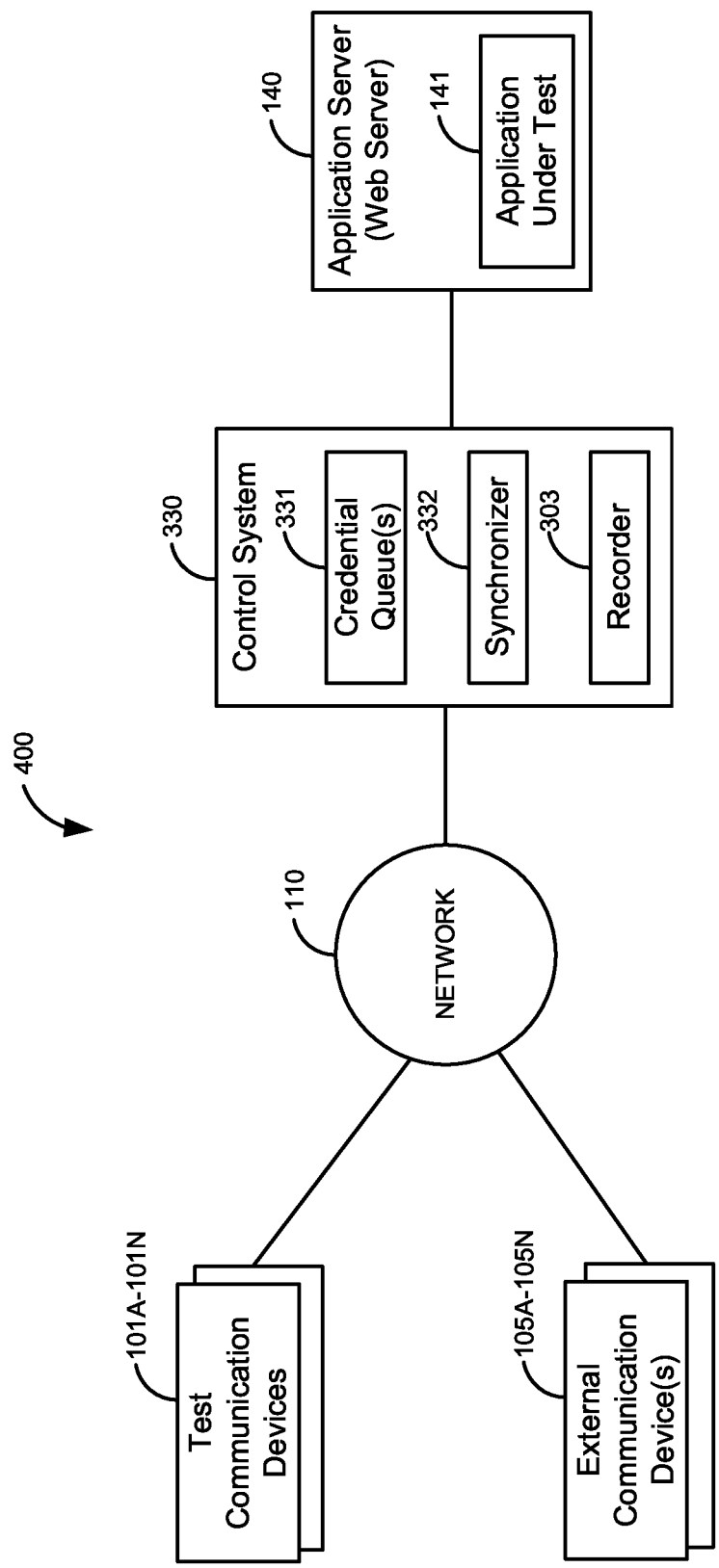
FIG. 4 is a block diagram of a fourth illustrative system for automatically providing multi-factor authentication in a test environment for multiple devices.

FIG. 4 is a block diagram of a fourth illustrative system 400 for automatically providing multi-factor authentication in a test environment for multiple devices. The fourth illustrative system 400 is different from the third illustrative system 300 because it comprises test communication devices 101A-101N and external communication devices 105A-105N. The multiple test communication devices 101A-101N and the multiple external communication devices 105A-105N are used to simulate multiple users authenticating to the application under test 141 at the same time with the control system 330/application server 140 described in FIG. 3. By having the multiple test communication devices 101A-101N and multiple external communication devices 105A-105N, a more realistic simulation of the real-world environment can be achieved in the test environment. In FIG. 4, the test communication devices 101A-101N and the external communication devices 105A-105N may also comprise the respective elements 102/106-109.

Figure 5:
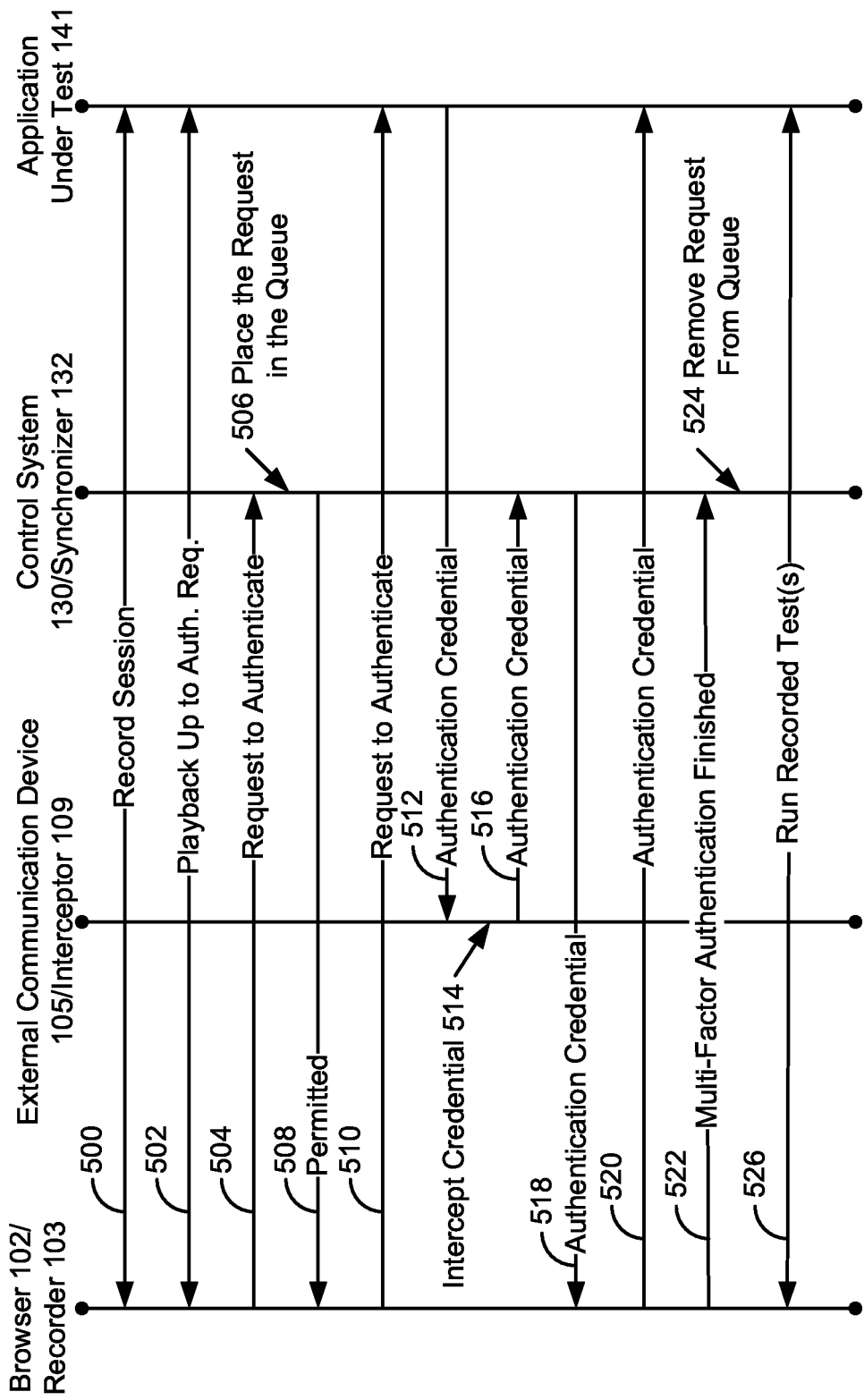
FIG. 5 is a flow diagram of a process for automatically providing multi-factor authentication in a test environment.

FIG. 5 is a flow diagram of a process for automatically providing multi-factor authentication in a test environment. Illustratively, the test communication devices 101A-101N, the browser(s) 102, the recorder 103, the external communication devices 105A-105N, the email application 106, the text messaging application 107, the biometric application(s) 108, the interceptor 109, the control system 130, the request queue(s) 131, the synchronizer 132, the application server 140, the application under test 141, the control system 330, the synchronizer 332, and the recorder 303 are stored-program-controlled entities, such as a computer or microprocessor, which performs the method of FIGS. 5-8 and the processes described herein by executing program instructions stored in a computer readable storage medium, such as a memory (i.e., a computer memory, a hard disk, and/or the like). Although the methods described in FIGS. 5-8 are shown in a specific order, one of skill in the art would recognize that the steps in FIGS. 5-8 may be implemented in different orders and/or be implemented in a multithreaded environment. Moreover, various steps may be omitted or added based on implementation.

The process of FIG. 5 may be used in conjunction with the first illustrative system 100 of FIG. 1, the second illustrative system 200 of FIG. 2, and/or other similar test environments.

The process starts in step 500 where the recorder 103 records a testing session of the application under test 141. The testing session may include various types of tests to test the application under test 141, such as, security testing, user interface testing, implementation testing, usability testing, and/or the like. The recorded testing session typically includes testing the authentication process, which may include multi-factor authentication. The authentication process typically includes one or more authentication credentials, such as, a username/password, a SMS code, an email code, a chat code, a biometric scan (e.g., a fingerprint scan, a facial print scan, an iris scan, a palm print scan, a voiceprint, etc.), a combination of these, and/or the like. Where more than one authentication credential is used (e.g., a multi-factor authentication), at least one of the authentication credentials is sent to or comes from the external communication device 105. For example, an SMS code may be sent to the user's smartphone 105, an email code may be sent to the user's email address (which is received on the external communication device 105), a fingerprint scan may be received from the user's smartphone 105, and/or the like.

For authentication credentials that are static and don't require an external communication device 105 (e.g., a username/password), it is easy to record the username/password and then playback the username/password to authenticate the user. However, for authentication credentials where an external communication device 105 is required or a dynamic authentication code is required, the process is much more difficult to automate.

To rerun the recorded tests, the recorder 103 plays back the recorded session up to the required authentication process where an external communication device 105 is required in step 502. This step can be identified based on text recognition, window recognition, user intervention, and/or the like. If the authentication process first requires a username/password and then an SMS code, the recorder 103 plays back the recorded session up to where the SMS code is required. Instead of sending a request to authenticate to the application under test, the recorder 103 sends, in step 504, the request to authenticate (e.g., a request for an SMS code) to the synchronizer 132. The synchronizer 132 places, in step 506, the request to authenticate in the request queue 131. The process of determining which request queue 131 to place the request to authenticate in is further described in FIG. 6.

If the authentication is permitted in step 508, a permitted message is sent to the recorder 103. The recorder 103 sends, in step 510, the request to authenticate to the application under test 141 as is normally done in the authentication process. The application under test 141 sends, in step 512, the authentication credential to the external communication device 105. If the authentication credential is a biometric, the message of step 512 would be a request for a biometric credential.

The interceptor 109 intercepts, in step 514, the authentication credential. For example, if the authentication credential is a SMS code, the interceptor 109 intercepts the SMS code. For an email/chat, the process works in a similar manner where the interceptor gets the authentication code from an email message. If the authentication credential is for a biometric, the interceptor 109 stores a copy of the biometric from the recorded session. The interceptor 109 sends, in step 516, the authentication credential to the synchronizer 132. The synchronizer 132 sends, in step 518, the authentication credential to the browser/recorder 103. The recorder 103 sends, in step 520, the authentication credential to the application under test 141. This completes the authentication process for the application under test.

The recorder 103 sends, in step 522, a message that indicates that the multi-factor authentication process is finished to the synchronizer 132. The synchronizer 132, in step 524, removes the authentication request from the request queue 131. The process may age out any authentication requests that are in the request queue 131 that do not receive the necessary authentication credential. For example, an authentication request may be removed if there is not a authentication finished message after two minutes. The recorder 103 then runs the recorded tests in step 526.

The process of FIG. 5 can also work where there is more than one authentication credential required to be received/gathered from the external communication device 105. For example, a SMS code and a fingerprint scan may be required. In this case, the steps 504-524 would be repeated a second time.

The process of FIG. 5 will be repeated for multiple requests to authenticate. For example, there may be multiple requests to authenticate received from multiple test communication devices 101A-101N, from multiple browsers 102 running in the same test communication device, a combination of these, and/or the like. The requests to authenticate may be received in parallel, in series, in a random order, and/or the like. This allows to better replicate an actual production environment for the application under test 141.

Figure 6:
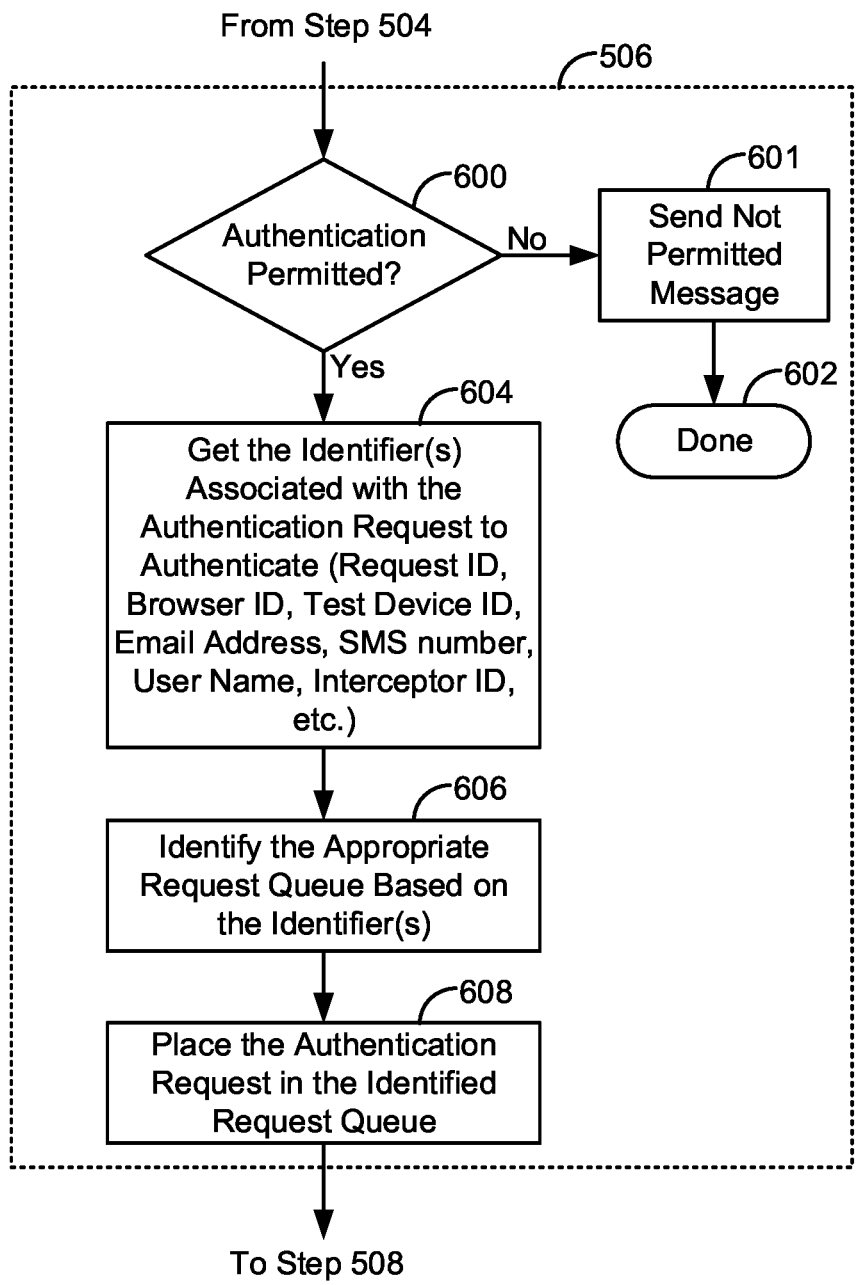
FIG. 6 is a flow diagram of a process for determining which request queue to place an authentication request into.

FIG. 6 is a flow diagram of a process for determining which request queue 131 to place an authentication request into. The process of FIG. 6 is an exemplary embodiment of step 506 of FIG. 5.

After receiving the request to authenticate in step 504, the synchronizer 132 determines, in step 600, if the authentication request is permitted. For example, the request to authenticate may not be permitted if the request to authenticate comes from an invalid or not approved test communication device 101. If the request to authenticate is not permitted in step 600, the process sends, in step 601, a not permitted message to the recorder 103. The process then ends in step 602.

Otherwise, if the request to authenticate is permitted in step 600, the synchronizer 132 gets one or more identifiers associated with the request to authenticate in step 604. The identifier(s) may be part of the request to authenticate message of step 504. For example, the identifier may be a request identifier, a browser identifier, a browser type identifier, a test communication device identifier, a telephone number (for an SMS code), an email addresses (for an email code), an external communication device identifier, an interceptor identifier, a user identifier (e.g., a username), a connection identifier (e.g., a connection identifier for a connection between the synchronizer 132/recorder 103), an application under test identifier, a biometric identifier (e.g., a type of biometric requested), a message identifier, and/or the like.

The synchronizer 132 identifies the appropriate request queue 131 based on the identifier(s) in step 606. The request queue(s) 131 may be created based on various factors. For example, a request queue 131 may be created for each browser 102 (the browser identifier is used to identify the request queue 131), for each test communication device 101 (the test device identifier is used to identify each request queue 131), for each interceptor 109 (an external test device identifier may be used), for each email address used, for each chat address used, for each telephone number used for SMS codes, for each external communication device 105 (external communication device identifier), a combination of these (e.g., test communication device identifier/browser type identifier), and/or the like. The request queue(s) 131 may be dynamically created (e.g., based on defined rules), created by an administrator, predefined, and/or the like The synchronizer 132 places the authentication request into the identified request queue 131 in step 608. The process then goes to step 508 of FIG. 5.

In one embodiment, there may only be a single request queue 131 for all authentication requests. In this embodiment, individual requests in the request queue 131 will have one or more identifiers associated with the authentication request that are used to remove the authentication requests from the request queue 131.

Figure 7:
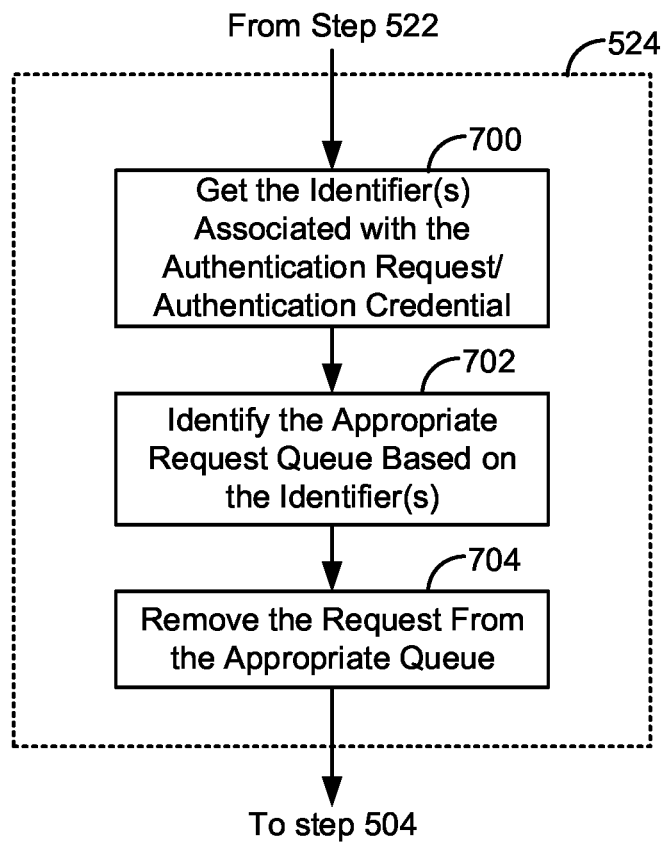

FIG. 7 is a flow diagram of a process for determining which request queue 131 to remove an authentication request from. FIG. 7 is an exemplary embodiment of step 524 of FIG. 5.

After step 522, the synchronizer 132 gets, in step 700, the identifier associated with the authentication request/authentication credential. The identifier(s) may be received along with the authentication credential in step 516 and/or step 522. The synchronizer 132 identifies the appropriate authentication request and request queue 131 based on the identifier(s) in step 702. The synchronizer 132 removes, in step 704, the authentication request from the appropriate request queue 131 using the same criteria (i.e., the identifiers) described above for placing the request into the request queue 131. The process then goes to step 504 to get the next request from the request queue 131 and sends the permitted message to start the authentication flow.

Figure 8:
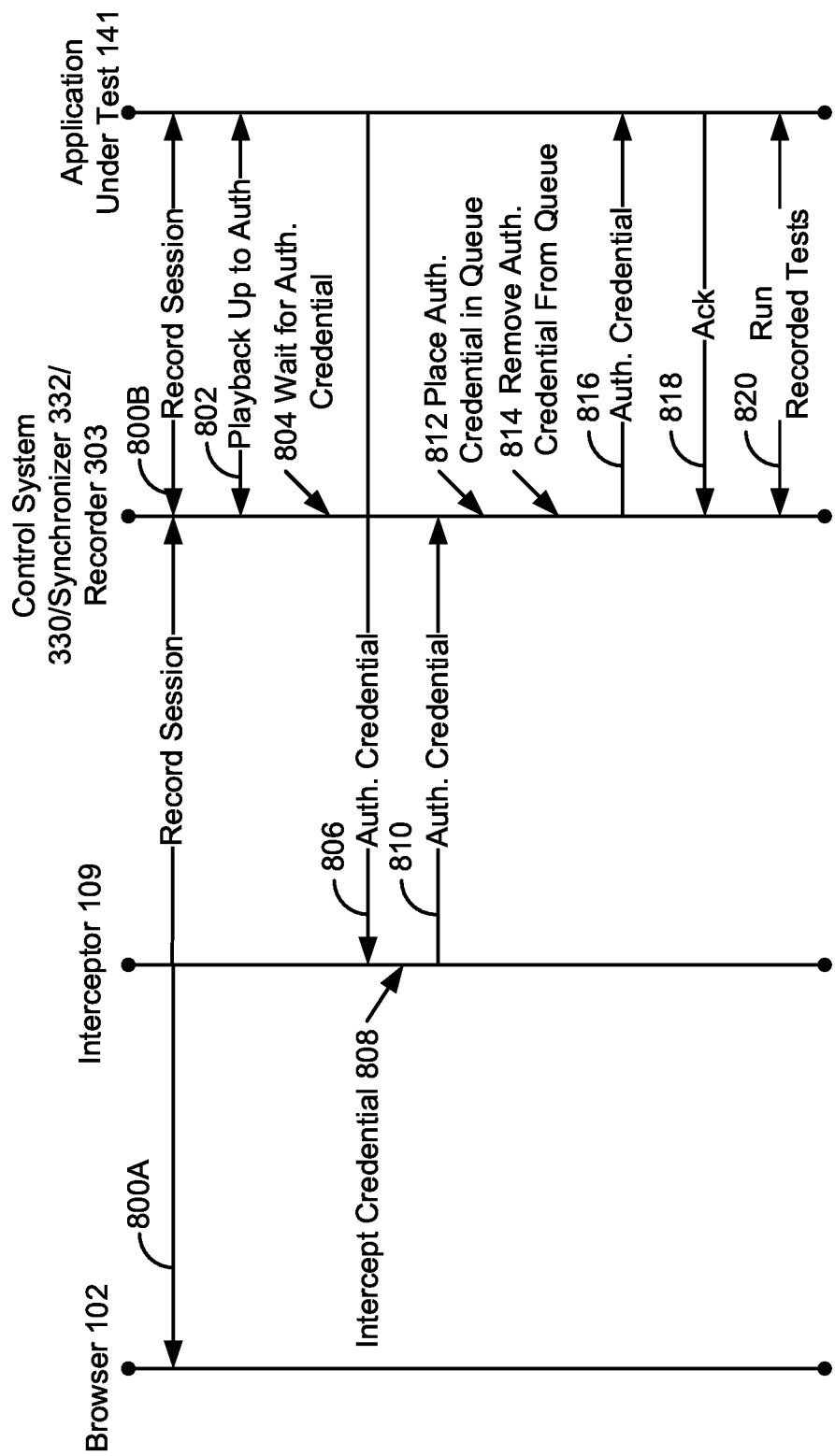
FIG. 8 is a flow diagram of a process for automatically providing multi-factor authentication in a test environment.

FIG. 8 is a flow diagram of a process for automatically providing multi-factor authentication in a test environment. The process of FIG. 8 may be used in conjunction with the third illustrative system 300 of FIG. 3, the fourth illustrative system 400 of FIG. 4, and/or other similar test environments.

The process starts in steps 800A-800B where a testing session is recorded. To rerun the recorded tests, the recorder 303 plays back the recorded session up to the required authentication process where an external communication device 105 is required in step 802. For example, if the authentication process first requires a username/password and then an email code, the recorder 303 plays back the recorded session up to where the email code is required. The recorder 303 starts a process that waits, in step 804, for the authentication credential. For example, a timer may be started. The application under test 141 sends, in step 806, the request to get the authentication credential to the external device 105. For example, the recorder 303 may provide a username/password, which causes the application under test 141 to request the authentication credential in step 806. The interceptor 109 intercepts, in step 808, the authentication credential or gets the biometric. The interceptor 109 sends the authentication credential to the control system 330/synchronizer 332 in step 810.

In one embodiment, the synchronizer 332 may place the authentication credential in the credential queue 331 in step 812. For example, for the embodiment described in FIG. 4, the synchronizer 332 may have a receiving thread that receives multiple authentication credentials and places the authentication credentials in a credential queue(s) 331. The placement of the authentication credentials in the credential queue(s) 331 may be based on identifier(s) like those discussed above for the authentication requests. The synchronizer 332 then removes the authentication credentials from the credential queue(s) 331 in step 814. For example, the synchronizer 332 may have a thread that removes the authentication credential(s) from the credential queue(s) 331. In one embodiment there may only be single credential queue 331.

In another embodiment, there may not be any credential queue(s) 331. In this embodiment, steps 812/814 are not implemented.

The synchronizer 332 sends, in step 816, the authentication credential to the application under test 141. The application under test 141 acknowledges the authentication credential in step 818. The recorder 303 runs the recorded tests in step 820.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that are capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive a first request from a first browser, wherein the first request is to authenticate via a first authentication credential provided from a first external communication device that is external to a first test communication device running the first browser;
place the first request in a first request queue;
receive the first authentication credential from a first interceptor that intercepts the first authentication credential in the first external communication device, wherein the first authentication credential is one of: a Short Message Service (SMS) code, a chat code, an email code, and a biometric identifier;
send the first authentication credential to the first browser, wherein the first authentication credential is used to authenticate to an application under test; and
remove the first request from the first request queue, wherein the first request is removed from the first request queue in response to receiving an authentication finished message from the first browser.

2. The system of claim 1, wherein the first browser sends the first authentication credential to the application under test.

3. The system of claim 1, wherein the microprocessor readable and executable instructions further cause the microprocessor to:
receive a second request from a second browser, wherein the second request is to authenticate via a second authentication credential provided from a second external communication device that is external to a second test communication device running the second browser;
place the second request in a second request queue;
receive the second authentication credential from a second interceptor that intercepts the second authentication credential in the second external communication device;
send the second authentication credential to the second browser, wherein the second authentication credential is used to authenticate to the application under test; and
remove the second request from the second request queue.

4. The system of claim 1, wherein the microprocessor readable and executable instructions further cause the microprocessor to:
receive a second request from a second browser, wherein the second request is to authenticate via a second authentication credential provided from the first external communication device that is external to a second test communication device running the second browser;
place the second request in the first request queue;
receive the second authentication credential from the first interceptor that intercepts the second authentication credential in the first external communication device;
send the second authentication credential to the second browser, wherein the second authentication credential is used to authenticate to the application under test; and
remove the second request from the first request queue.

5. The system of claim 1, wherein the microprocessor readable and executable instructions further cause the microprocessor to:
receive a second request from a second browser, wherein the second request is to authenticate via a second authentication credential provided from the first external communication device that is external to the first test communication device running the second browser;
place the second request in a second request queue;
receive the second authentication credential from the first interceptor that intercepts the second authentication credential in the first external communication device;
send the second authentication credential to the second browser, wherein the second authentication credential is used to authenticate to the application under test; and
remove the second request from the second request queue.

6. The system of claim 1, wherein placing the first request in the first request queue is based on one or more of:
a request identifier;
a browser identifier;
a browser type identifier;
a telephone number;
an email address;
a test communication device identifier
an external communication device identifier
an interceptor identifier;
a user identifier;
a connection identifier;
an application under test identifier;
a biometric identifier;
a messaging identifier; and
the first request queue being an only queue.

7. A method comprising:
receiving, by a microprocessor, a first request from a first browser, wherein the first request is to authenticate via a first authentication credential provided from a first external communication device that is external to a first test communication device running the first browser;
placing, by the microprocessor, the first request in a first request queue;
receiving, by the microprocessor, the first authentication credential from a first interceptor that intercepts the first authentication credential in the first external communication device, wherein the first authentication credential is one of: a Short Message Service (SMS) code, a chat code, an email code, and a biometric identifier;
sending, by the microprocessor, the first authentication credential to the first browser, wherein the first authentication credential is used to authenticate to an application under test; and
removing the first request from the first request queue, wherein the first request is removed from the first request queue in response to receiving an authentication finished message from the first browser.

8. The method of claim 7, wherein the first browser sends the first authentication credential to the application under test.

9. The method of claim 7, further comprising:
receiving a second request from a second browser, wherein the second request is to authenticate via a second authentication credential provided from a second external communication device that is external to a second test communication device running the second browser;
placing the second request in a second request queue;
receiving the second authentication credential from a second interceptor that intercepts the second authentication credential in the second external communication device;
sending the second authentication credential to the second browser, wherein the second authentication credential is used to authenticate to the application under test; and removing the second request from the second request queue.

10. The method of claim 7, further comprising:
receiving a second request from a second browser, wherein the second request is to authenticate via a second authentication credential provided from the first external communication device that is external to a second test communication device running the second browser;
placing the second request in the first request queue;
receiving the second authentication credential from the first interceptor that intercepts the second authentication credential in the first external communication device;
sending the second authentication credential to the second browser, wherein the second authentication credential is used to authenticate to the application under test; and
removing the second request from the first request queue.

11. The method of claim 7, further comprising:
receiving a second request from a second browser, wherein the second request is to authenticate via a second authentication credential provided from the first external communication device that is external to the first test communication device running the second browser;
placing the second request in a second request queue;
receiving the second authentication credential from the first interceptor that intercepts the second authentication credential in the first external communication device;
sending the second authentication credential to the second browser, wherein the second authentication credential is used to authenticate to the application under test; and
removing the second request from the second request queue.

12. The method of claim 7, wherein placing the first request in the first request queue is based on one or more of:
a request identifier;
a browser identifier;
a browser type identifier;
a telephone number;
an email address;
a test communication device identifier
an external communication device identifier
an interceptor identifier;
a user identifier;
a connection identifier;
an application under test identifier;
a biometric identifier;
a messaging identifier; and
the first request queue being an only queue.

13. A system comprising:
a microprocessor; and
a computer readable medium, coupled with the microprocessor and comprising microprocessor readable and executable instructions that, when executed by the microprocessor, cause the microprocessor to:
start a process to wait for an authentication credential, wherein the authentication credential is received as part of an automated multi-factor authentication process and wherein the authentication credential is received from an external communication device;
receive, from the external communication device, the authentication credential, wherein the authentication credential is one of: a Short Message Service (SMS) code, a chat code, an email code, and a biometric identifier;
place the authentication credential into a credential queue;
send the authentication credential to an application under test;
receive an acknowledgement of receipt of the authentication credential; and
in response to receiving the acknowledgement of the receipt of the authentication credential, automatically run one or more recorded tests of the application under test and remove the authentication credential from the credential queue.

14. The system of claim 13, further comprising: recording the one or more recorded tests.

* * * * *